United States Patent
Wilson et al.

(10) Patent No.: US 9,823,733 B2
(45) Date of Patent: Nov. 21, 2017

(54) METHODS AND APPARATUS FOR REDUCING POWER CONSUMPTION WITHIN EMBEDDED SYSTEMS

(71) Applicant: APPLE INC., Cupertino, CA (US)

(72) Inventors: Daniel Wilson, San Francisco, CA (US); Anand Dalal, San Jose, CA (US); Josh De Cesare, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/394,565

(22) Filed: Dec. 29, 2016

(65) Prior Publication Data

US 2017/0139468 A1    May 18, 2017

Related U.S. Application Data

(63) Continuation of application No. 14/046,824, filed on Oct. 4, 2013, now Pat. No. 9,535,875.

(60) Provisional application No. 61/709,567, filed on Oct. 4, 2012.

(51) Int. Cl.
*G06F 1/32*     (2006.01)
*G06F 13/42*    (2006.01)
*G06F 13/364*   (2006.01)

(52) U.S. Cl.
CPC .......... *G06F 1/3287* (2013.01); *G06F 13/364* (2013.01); *G06F 13/4282* (2013.01)

(58) Field of Classification Search
CPC ................ G06F 13/102; G06F 13/385; G06F 2213/0042
See application file for complete search history.

(56) References Cited

U.S. PATENT DOCUMENTS

| | | | | |
|---|---|---|---|---|
| 7,313,794 B1* | 12/2007 | Ansari | ...................... | G06F 9/52 |
| | | | | 710/108 |
| 8,281,058 B1* | 10/2012 | McCorkendale | ..... | G06F 13/102 |
| | | | | 710/104 |
| 8,838,949 B2* | 9/2014 | Gupta | ................... | G06F 9/4405 |
| | | | | 712/30 |
| 8,850,252 B2* | 9/2014 | Doshi | ..................... | G06F 13/20 |
| | | | | 710/10 |
| 8,909,818 B2* | 12/2014 | Manor | ................ | G06F 11/0745 |
| | | | | 710/11 |
| 9,065,674 B2* | 6/2015 | Gruber | ............. | H04L 12/40013 |
| 9,111,043 B2* | 8/2015 | Sasaki | .................... | G06F 13/385 |
| 9,251,036 B2* | 2/2016 | Christiansen | ......... | G06F 11/349 |

(Continued)

FOREIGN PATENT DOCUMENTS

| | | |
|---|---|---|
| CN | 1656435 A | 8/2005 |
| CN | 101573675 A | 11/2009 |

*Primary Examiner* — Brian Misiura
(74) *Attorney, Agent, or Firm* — Gazdzinski & Associates, PC

(57) ABSTRACT

Methods and apparatus for managing connections between multiple internal integrated circuits (ICs) of, for example, a high-speed internal device interface. Improved schemes for coordination of connection and disconnection events, and/or suspension and resumption of operation for a High-Speed Inter-Chip™ (HSIC) interface are disclosed. In one exemplary embodiment, a "device"-initiated and "host"-initiated connect/disconnect procedure is disclosed, that provides improved timing, synchronization, and power consumption.

20 Claims, 6 Drawing Sheets

(56) References Cited

U.S. PATENT DOCUMENTS

| | | | | |
|---|---|---|---|---|
| 2010/0162022 A1* | 6/2010 | Kim | ............ | G06F 1/266 |
| | | | | 713/324 |
| 2012/0233361 A1* | 9/2012 | Dalal | ............ | G06F 13/102 |
| | | | | 710/32 |
| 2012/0246505 A1* | 9/2012 | Ma | ............ | G06F 1/00 |
| | | | | 713/324 |
| 2013/0336334 A1* | 12/2013 | Gilbert | ............ | H04J 3/16 |
| | | | | 370/458 |
| 2013/0346640 A1* | 12/2013 | Gui | ............ | G06F 13/10 |
| | | | | 710/14 |
| 2014/0013137 A1* | 1/2014 | Wilson | ............ | G06F 1/00 |
| | | | | 713/323 |

\* cited by examiner

METHODS AND APPARATUS FOR REDUCING POWER CONSUMPTION WITHIN EMBEDDED SYSTEMS

PRIORITY

This application is a continuation of, and claims priority to, co-owned and co-pending U.S. patent application Ser. No. 14/046,824 filed on Oct. 4, 2013 and entitled "METHODS AND APPARATUS FOR REDUCING POWER CONSUMPTION WITHIN EMBEDDED SYSTEMS", which claims priority to U.S. Provisional Patent Application Ser. No. 61/709,567 filed on Oct. 4, 2012 of the same title, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of computerized devices and user interfaces. More particularly, in one exemplary embodiment, connection management of multiple internal integrated circuits (ICs) of a device, such as for example with respect to High-Speed Inter-Chip™ (HSIC) implementations, are disclosed.

2. Description of Related Technology

Many products integrate multiple integrated circuits (ICs) (also colloquially referred to as "chips") within a single form factor design. Multi-chip construction reduces design time for commodity components (e.g., memory, processors, etc.), and enables manufacturers to focus on overall device design and capabilities. One important consideration in multi-chip device construction is inter-chip communication.

As used herein, the term "inter-chip" refers without limitation to connections between ICs of a device. HSIC (High-Speed Inter-Chip™) is an existing industry standard for an inter-chip communications. HSIC physical signaling is a source synchronous two-wire (STROBE, DATA) serial interface. Existing solutions provide a 480 Mbps data rate (240 MHz Double Data Rate (DDR)). Signaling is bi-directional, and uses Non-Return-to-Zero-Inverted (NRZI) line coding. From a software protocol standpoint, HSIC is based on the Universal Serial Bus™ (USB) software protocol, and is typically compatible with existing USB software stacks.

While HSIC has removed the physical elements of USB operation (e.g., physical cables, etc.) which reduce complexity, cost, and power consumption, existing HSIC implementations still do not support multiple desirable usage scenarios. For example, existing HSIC does not support: (i) "device"-initiated connect/disconnect (a HSIC "device" denotes a chip which behaves in a similar manner to a USB device, for clarity hereinafter this will be referenced as a "slave IC"), (ii) "host" initiated connect/disconnect (a HSIC "host" denotes a chip which behaves in a similar manner to a USB host device, for clarity hereinafter this will be referenced as a "master IC"), (iii) timing and synchronization between the master IC and slave IC, and (iii) power conservation and consumption, etc.

Accordingly, improved methods and apparatus are needed for managing connections of multiple internal integrated circuits (ICs) within a device. Specifically, improved schemes are needed for coordination of connection and disconnection events, and/or suspension and resumption of operation. Additionally, ideal solutions should reduce power consumption, and minimally affect performance (i.e., fast start times, etc.).

SUMMARY

The present disclosure satisfies the aforementioned needs by providing, inter alia, improved apparatus and methods for connection management of multiple internal integrated circuits (ICs) of a device.

A method for managing connections between a first processor and a second processor of an internal device interface is disclosed. In one embodiment, the method includes: performing a handshake procedure; responsive to the handshake procedure, connecting the first processor to the second processor; transacting data via the connection; and responsive to a suspension condition, suspending the connection.

An apparatus configured to internally manage connections between a first processor and a second processor is disclosed. In one embodiment, the apparatus includes: logic configured to perform a handshake procedure; responsive to the handshake procedure, logic configured to connect the first processor to the second processor; logic configured to transact data via the connection; and responsive to a suspension condition, logic configured to suspend the connection, Non-transitory computer readable medium is disclosed. In one embodiment, the non-transitory computer-readable medium includes instructions which when executed by a first processor, cause the first processor to: perform a handshake procedure with a second processor; responsive to the handshake procedure, connect the first processor to the second processor; transact data via the connection; and responsive to a suspension condition, suspend the connection.

A method of operating a computerized apparatus is also disclosed.

A computerized system having multiple IC's, is also disclosed herein.

In another aspect of the present disclosure, an integrated circuit apparatus is disclosed. In one embodiment, the integrated circuit apparatus comprises: a high-speed data interface configured to transact data with another integrated circuit; an out-of-band interface configured to manage the high-speed data interface; and first logic configured to perform a handshake procedure via the out-of-band interface while the high-speed data interface is in a disconnected state, the first logic configured to: responsive to a first signal indicating that the another integrated circuit is awake, assert a second signal to indicate that the integrated circuit apparatus is ready to connect once the high-speed data interface transitions to an idle state; second logic configured to connect to the another integrated circuit, the second logic configured to: when the high-speed data interface is in the idle state, establish a data connection between the integrated circuit apparatus and the another integrated circuit; wherein the established data connection is configured based on one or more parameters related to at least one of the integrated circuit apparatus and the another integrated circuit; and third logic configured to transfer one or more data between the integrated circuit apparatus and the another integrated circuit via the established data connection.

In another aspect of the present disclosure, a system is disclosed. In one embodiment, the system is configured to manage a data connection between a plurality of integrated circuits (ICs) of a high-speed data interface, and the system comprises: a first and a second IC; a high-speed data interface coupled to the first and the second IC; an out-of-band interface coupled to the first and the second IC; the first IC configured to assert a first signal via the out-of-band interface while the high-speed data interface is in a disconnected state to indicate that the first IC is awake; responsive to the assertion of the first signal, the second IC configured to assert a second signal to indicate that the second IC is ready to connect once the high-speed data interface transitions to an idle state; responsive to the assertion of both the first and the second signal, the high-speed data interface configured to transition to the idle state; and when the high-speed data interface transitions to the idle state, the first and second IC configured to establish a data connection; wherein the established data connection is configured based on one or more parameters related to at least one of the first and the second IC; and wherein the first and the second IC are configured to transfer one or more data via the established data connection.

Other features and advantages of the present disclosure will immediately be recognized by persons of ordinary skill in the art with reference to the attached drawings and detailed description of exemplary embodiments as given below.

All Figures Copyright 2012-2013 Apple Inc. All rights reserved.

DETAILED DESCRIPTION

Reference is now made to the drawings, wherein like numerals refer to like parts, throughout.

Detailed Description or Exemplary Embodiments

Exemplary embodiments of the various aspects of the disclosure are now described in detail. While these embodiments are primarily discussed in the context of the High-Speed Inter-Chip™ (HSIC) and Universal Serial Bus™ (USB) protocols, it will be recognized by those of ordinary skill when given this disclosure that the present disclosure is not so limited. In fact, the various principles described herein are useful in any high-speed bus protocol that can benefit from the various modifications and improvements described herein.

Additionally, the present disclosure is useful in any number of different types of devices including without limitation computers (desktops, towers, laptops, etc.), hand-held devices such as smart phones and MP3 players, digital readers or tablets, and navigation systems (hand-held and in-vehicle). For instance, exemplary consumer electronics products manufactured by the Assignee hereof that may benefit from one or more disclosed features include but are not limited to, the iPhone™, iPod™, IPad™, Macbook™, Macbook Pro™ Macbook Air™, etc.

Overview

In one aspect, methods and apparatus for managing connections between multiple internal integated circuits (ICs) of e.g., a high-speed internal device interface, are disclosed. In exemplary embodiments, improved schemes for coordination of connection and disconnection events, and/or suspension and resumption of operation for a High-Speed Inter-Chip™ (HSIC) interface are provided. In one implementation, a "device"-initiated and "host"-initiated connect/disconnect procedure is disclosed, that provides improved timing, synchronization, and power consumption. The connect/disconnect procedure comprises a handshake between the ICs, A data connection is established between the ICs responsive to a successful handshake. The connect/disconnect procedure is used upon a termination condition to trigger either suspension and/or complete termination of the data connection between the ICs.

Methods—

Figure 1:
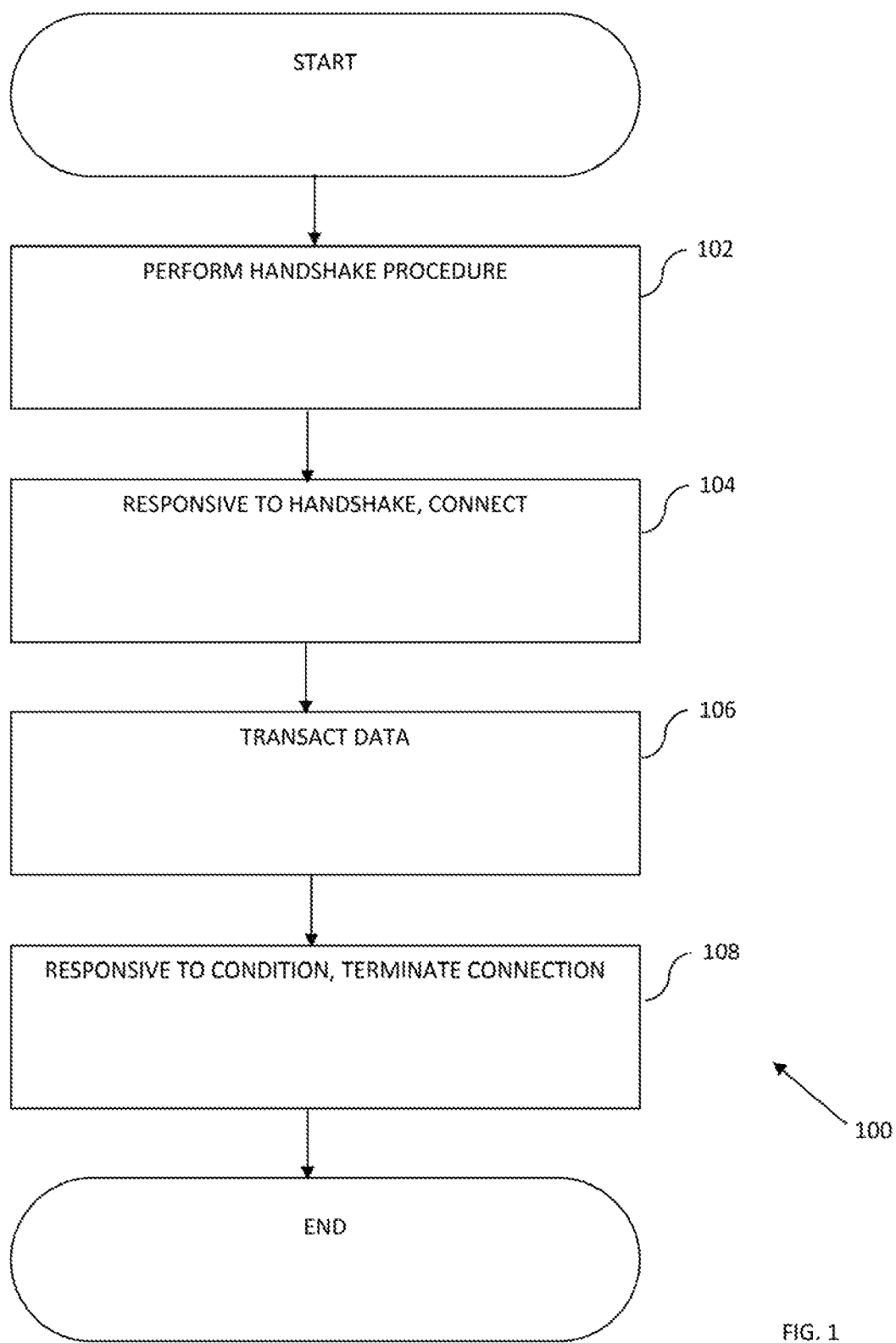
FIG. 1 is a logical flow diagram of one embodiment of a method for managing connections between multiple internal integrated circuits (ICs) of a high-speed internal device interface.

FIG. 1 illustrates one embodiment of a method 100 for managing connections between multiple internal integrated circuits (ICs) of a high-speed internal device interface.

At step 102 of the method 100, a first processor and a second processor perform a handshake procedure. A "handshake" procedure enables the first processor and the second processor to synchronize subsequent transactions. Handshaking procedures can compensate for any loss of synchronization caused by e.g., intentional or unintentional interruptions, power saving modes, connection/disconnection, etc. Specifically, any time communication between the first processor and second processor is severed, the processors will divert to other tasks. The handshake procedure ensures that both processors are ready to reinitiate communication, before either processor performs a data transaction.

In one embodiment, the first processor is a master processor and the second processor is the slave processor. In an alternate embodiment, the first processor is a slave processor and the second processor is the master processor. In yet another embodiment, the first and second processors are peer entities. In still another embodiment, the first and second processors arbitrate for bus control. Common schemes for arbitration useful with the present disclosure include e.g., round robin, weighted round robin, first in first out (FIFO), last in first out (LIFO), etc.

In one embodiment, the handshake procedure is performed via out-of-band signaling. In one variant, the out-of-band signaling includes one or more general purpose input output (GPIO) signals. In other variants, the out-of-band signaling includes one or more interrupts. In some implementations the out-of-band signaling is based on a physically distinct interface of the high-speed internal device interface. In alternate implementations, the out-of-band signaling is logically distinct (i.e., has different signaling protocols, etc.), but is performed on the high-speed internal device interface.

Responsive to a successful handshake procedure, at step 104 of the method 100, the first and second processors connect. In one exemplary embodiment, the connection procedure is implemented over the high-speed internal device interface. For example, in one exemplary embodiment, the first processor transmits a connection message to the second processor via the high-speed internal device interface. In one such example, a slave IC transmits a CONNECT message to a master IC. In alternate examples, the master IC can transmit a CONNECT message to the slave IC.

In one embodiment, the connection includes a message indicative of successful and/or unsuccessful connection. The foregoing message may be either a literal acknowledgement or non-acknowledgement message, or alternately may be implied (e.g., by a lack of response, incorrect signaling, etc.). In some variants, failure to establish a connection may trigger an error flag for one or more software entities of the first or second processor. For example, if a master IC cannot connect to a slave IC, the master IC may trigger a software flag, such that internal software does not abruptly "hang" in an endless loop. In some implementations, the internal software flag may be logged for later use in diagnosing potential problems, etc.

In other embodiments, the connection may be established in spite of an unsuccessful handshake procedure. For example, in some implementations, a slave IC should respond within a designated time interval of receiving a connection request from a master IC. However, in the event the slave IC is unresponsive, the master IC may continue with a subsequent connection signaling such that the slave IC can attempt to recover proper operation during subsequent messaging.

In some embodiments, establishing the connection may include transference of one or more parameters, such as for instance those which may be used to optimize connectivity. In one exemplary embodiment, the master IC and slave IC can be configured to support more aggressive timing constraints. Common examples of other such parameters include, without limitation: supported transfer speeds, supported transfer sizes, supported coding rates, supported protocols, etc. In other variants, these parameters may be used to synchronize information which may have been: lost (e.g., such as volatile memory contents), collected (e.g., via monitoring processes), fallen out of synchronization, etc. In still other embodiments, the parameters may include a possible cause for re-establishing connection (e.g., requested operation, device transfer, update, etc.). Those of ordinary skill in the related arts will recognize the myriad of other parameters which have suitable utility within the connection establishment and/or initialization, given the contents of the present disclosure.

Moreover, those of ordinary skill in the related arts will recognize that various embodiments described herein may further subdivide the connection procedure into a greater (or fewer) number of states. For example, the connection state may be further subdivided into idle states, wait states, warm-up states, connection states, parameter negotiations, limited operation states, etc.

At step 106 of the method 100, the first and second processors transact data via the established connection. Data transfers can include e.g., data transfers, control operations, arbitration, streaming data, user interaction, etc.

Within the context of HSIC communication, data transfers are in the form of packetized communication. Common examples of packets include, without limitation: handshake packets, token packets, data packets.

Handshake packets are utilized within the software in response to reception of one or more data packets. Handshake packets include e.g., ACK (data was successfully received), NAK (data was not received and should be retried), STALL (error condition), NYET (a transaction is not yet complete and/or cannot accept any more data packets due to buffers being full), and ERR (a transaction failure). For clarity, handshake packets are not used in the aforementioned handshake step 102, and should be considered an unrelated protocol.

Token packets are used in data flow control. For example, the master IC can transmit an IN or OUT token, which instructs the slave IC to perform the corresponding data transaction (i.e., to send or receive one or more data packets). Other examples of token packets include e.g., setup tokens, split transaction tokens, etc.

A data packet can contain up to 1,023 bytes of data payload, arid a 16-bit CRC (cyclic redundancy cheek). Each data packet is preceded by an address token, and is usually followed by a handshake token. Additionally, data packets may be "typed" to assist in error recovery. For example, in sonic variants, data packets are typed as DATA0, DATA1, DATA2, etc. each packet is transmitted in a recognizable sequence (e.g., DATA0, DATA1, DATA2, DATA0, etc.) so as to assist in resolving connectivity issues. Specifically, the receiver keeps track of the type of DATAx packet it last received. If the device receives unexpected DATAx packets, then an error is flagged.

At step 108 of the method 100, responsive to a termination condition, the connection is suspended and/or terminated. In one embodiment, at least one of the first and second processors request the link be suspended. In other embodiments, the termination condition is an assertion of a reset. In still, other embodiments, the termination condition may be based on e.g., a time interval of inactivity, power consumption considerations, an error condition (which presumably can be resolved by resetting the connection), etc.

In some variants, a second handshake procedure enables the first processor and the second processor to synchronize suspension procedures. Handshaking procedures can ensure that both processors are ready to suspend communication, thus preventing, possible "hung" states (i.e., where one processor is waiting for a suspended processor's response). Alternatively, suspension/termination may not require a handshake. Such variants may be especially useful in embodiments where the connection may be abruptly terminated without a priori notification. In a similar vein, it is further appreciated that the processors may be farther configured to automatically suspend the connection if the connection is inactive or in an error state (e.g., indicating an abrupt and/or unexpected connection problem).

As previously noted, the suspension/termination procedure may be performed via out-of-band signaling, or may be logically distinct, etc.

Apparatus—

Figure 2:
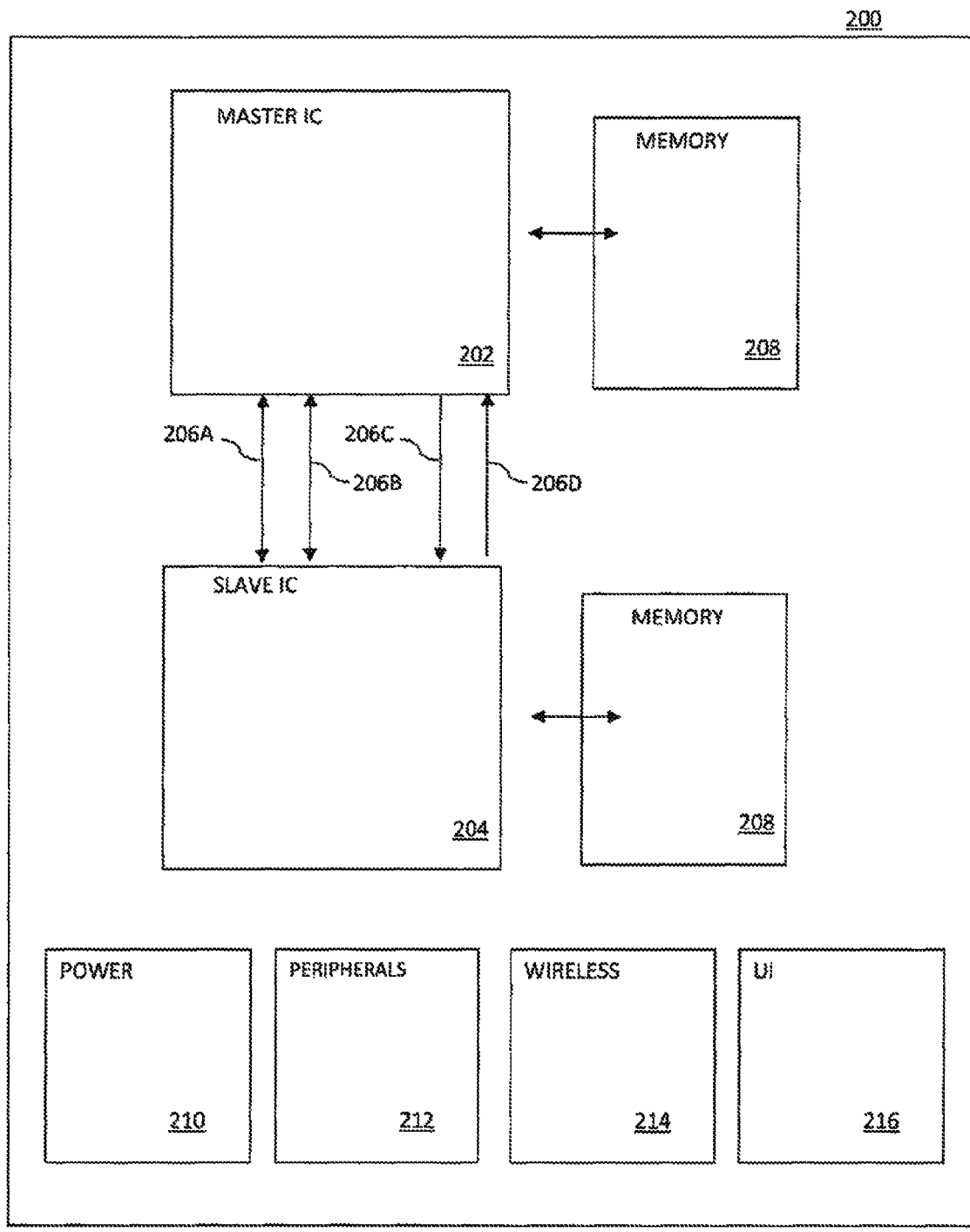
FIG. 2 is a logical block diagram of one exemplary embodiment of a user device apparatus implementing the High-Speed Inter-Chip (HSIC) interface.

FIG. 2 illustrates an exemplary user device apparatus 200 implementing the High Speed Inter-Chip (HSIC) interface. As shown, the device 200 includes a HSIC "host" integrated circuit (IC) 202 (or master IC), and a HSIC "device" IC 204

(slave IC). While the exemplary user device only includes two ICs, it is appreciated that the foregoing topology is purely illustrative, and other more complex topologies (e.g., three ICs, four ICs, etc.) are readily implemented by one of ordinary skill in the related arts, given the contents of the present disclosure.

As used herein, the term "user device" includes, but is not limited to cellular telephones, smart phones (such as for example an iPhone™), so-called "phablets", personal computers (PCs), such as for example Macbook™, Macbook Pro™ Macbook Air™, and minicomputers, whether desktop, laptop, or otherwise, as well as mobile devices such as handheld computers, PDAs, video cameras, set-top boxes, personal media devices (PMDs), such as for example an iPod™, iPad™, display devices (e.g., those compliant with the aforementioned HSIC standard(s)), or any combinations of the foregoing. While a specific device configuration and layout is shown and discussed, it is recognized that many other implementations may be readily implemented by one of ordinary skill given the present disclosure, the user device 200 of FIG. 2 being merely illustrative of the broader principles disclosed herein.

In one exemplary embodiment, the master IC 202 and slave IC 204 include one or more of central processing units (CPU) or digital processors, such as a microprocessor, digital signal processor, field-programmable gate array, RISC core, or plurality of processing components mounted on one or more substrates.

Each IC is coupled to operational memory 208, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

In one exemplary embodiment, the HSIC interface includes: a data signal (DATA) 206A, a strobe signal (STROBE) 206B, a master IC ready signal (HOST_READY) 206C, and a slave IC ready signal (DEVICE_READY) 206D.

In one such variant, neither the HSIC master IC nor slave IC applies a pull-up or pull-down resistor on the STROBE and DATA. Furthermore, the HSIC master IC and slave IC only drive the STROBE and DATA for connection and connection signaling (i.e., neither the master IC nor slave IC drive the STROBE or DATA for reasons other than HSIC transactions). STROBE and DATA are bidirectional, and may be driven by either the master IC or the slave IC of the bus. It is appreciated that the foregoing restrictions are merely provided for clarity, and that other technologies and/or implementation specific versions of HSIC may not necessarily comply with the foregoing.

HOST_READY and DEVICE_READY are low frequency signals for connection management. DEVICE_READY is a control signal that is unidirectionally driven by the slave IC, and is configured to enable and disable the HSIC port. Similarly, HOST_READY is a control signal that is unidirectionally driven by the master IC, and is configured to request, a change of DEVICE_READY. Specifically, when the HOST_READY is asserted by the master IC, the slave IC should responsively assert the DEVICE_READY and both master IC and slave IC enable HSIC circuitry for transactions. Similarly, when the HOST_READY is deasserted by the master IC, the slave IC can deassert the DEVICE_READY, and both master IC and slave IC can transition to an IDLE state. In some embodiments, the HOST_READY signal has a pull-down resistor to avoid a floating value when the master IC is not driving a value. TABLE 1 and TABLE 2 summarize HOST_READ and DEVICE_READY logic, respectively.

TABLE 1

| CONDITION | ACTION |
| --- | --- |
| Master IC wakes | Assert HOST_READY |
| Master IC suspends | Deassert HOST_READY |
| Master IC is awake, DEVICE_READY asserts | Assert HOST_READY |
| Master IC is awake, DEVICE_READY deasserts | Deassert HOST_READY |

TABLE 2

| CONDITION | ACTION |
| --- | --- |
| HOST_READY asserts | Assert DEVICE_READY |
| HOST_READY deasserts | Deassert DEVICE_READY |
| Slave IC connects | Assert DEVICE_READY |
| Slave IC disconnects | Deassert DEVICE_READY |

Those of ordinary skill will recognize that as used throughout, the logical levels may be defined as being "active high" (i.e., the assertion voltage is high, the deassertion voltage is low) or "active low" (i.e., the assertion voltage is low, the deassertion voltage is high); however, polarity must be consistent between the master IC and the slave IC (and any other ICs which are interconnected).

Moreover it is appreciated that in some variants, devices can be constructed with a fixed Boot ROM that is not capable of controlling the DEVICE_READY singal. Accordingly, in some, embodiments, the device may include a hardware solution or a software agent to assert the DEVICE_READY signal for the slave IC.

As previously alluded to, existing HSIC solutions are based on USB (e.g., USB 2.0) software; however, existing USB 2.0 software is designed to suit a wide variety of use scenarios. Accordingly, existing HSIC solutions implement overly generous timing intervals for the interface between the master IC and the slave IC.

In one exemplary embodiment, the master IC and slave IC can be configured to support more aggressive timing constraints. In one such variant, the master IC and slave IC can be configured statically or semi-statically with suitable timing intervals. For example, a manufacturer may determine (based on simulation, empirical evidence, and/or manufacturing tolerances) a reasonable timing interval. In other variants, the master IC and slave IC can be configured dynamically (e.g., based on run time data) to adjust appropriate timing intervals. Examples of configurable timing intervals are provided in TABLE 3.

TABLE 3

| TIMING PARAMETER | EXISTING TIMING | ADJUSTED TIMING |
| --- | --- | --- |
| $T_{ATTDB}$—electrical mechanical stabilization | 100 ms | 0 ms |
| $T_{RSTRCY}$—reset recovery | 10 ms | 0 ms |
| $T_{DRST}/T_{DRSTR}$—reset duration | 10 ms/50 ms | Less than 10 ms |
| Suspend Detection | 3 ms | 3 ms |
| $T_{DRSMDN}$—resume duration | 20 ms | Less than 20 ms |
| Resume Recovery Period | 10 ms | Less than 10 ms |
| Set Address Recovery | 2 ms | 2 ms |

For example, as shown in TABLE 3, the master IC and slave IC do not require the time interval $T_{ATTDB}$ to provide electrical mechanical stability, as the master IC and slave IC are not connected via a USB cable (existing electrical and mechanical time intervals provide enough time for noise to stabilize when plugging or unplugging a USB cable). Similarly, existing reset recovery time intervals ensure that reset signaling has enough time to propagate via the USB cable, and are also unnecessary for the HSIC master IC and slave IC. Other signaling parameters may be optimized to improve overall performance; for example, resume duration timing can be reduced to improve resumption speeds, however shorter resume duration timing may additionally consume more power (e.g., the master IC and/or slave IC have to monitor for resume signaling more frequently).

More generally, it is appreciated that a wide variety of parameters which have been designed to accommodate USB (e.g., USB 2.0) device-to-device communication are unnecessary for HSIC interface operation.

Referring back to FIG. 2, various embodiments of the present disclosure may be further combined with e.g., power management system 210, peripheral devices 212, wireless subsystems 214, user interface (UI) elements 216, etc.

The illustrated power management subsystem 210 provides power to the device, and may include an integrated circuit and or a plurality of discrete electrical components. In portable devices, the power management subsystem 210 may additionally be configured to interface with a rechargeable battery power source within the device.

The apparatus may further include optional additional peripherals 212 including, without limitation, one or more GPS transceivers, or network interfaces such as IrDA ports, Bluetooth transceivers, USB, Fire Wire™, WiMAX transceivers, etc.

Wireless subsystems 214 may include the antenna and any analog stages used to convert a received radio signal to a digital signal. An RF front-end may include a wide variety of filters, amplifiers, analog-to-digital converters (A/D), digital-to-analog (D/A) converters (including e.g., direct or delta-sigma converters), mixers, multiplexers, duplexers, diplexers, etc. Due to the very specific nature of RF reception, RF front-ends are generally adapted to a very limited range of operation.

In some instances, multiple RF front-ends may be required for different radio frequencies, and or radio access technologies (RATs). For example, common user devices may incorporate e.g., a cellular network interface, a wireless local area network (WLAN) interface, a Bluetooth interface, etc.

The user interface subsystem 216 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card type embodiments may lack a user interface (as they could piggyback onto the user interface of the device to which they are physically and/or electrically coupled).

Exemplary High-Speed Inter-Chip (HSIC) Operation—

The following discussions (FIGS. 3A-3H) provide illustrative examples of various signaling transactions, in combination with various disclosed embodiments.

Connect Signaling—

Figure 3A:
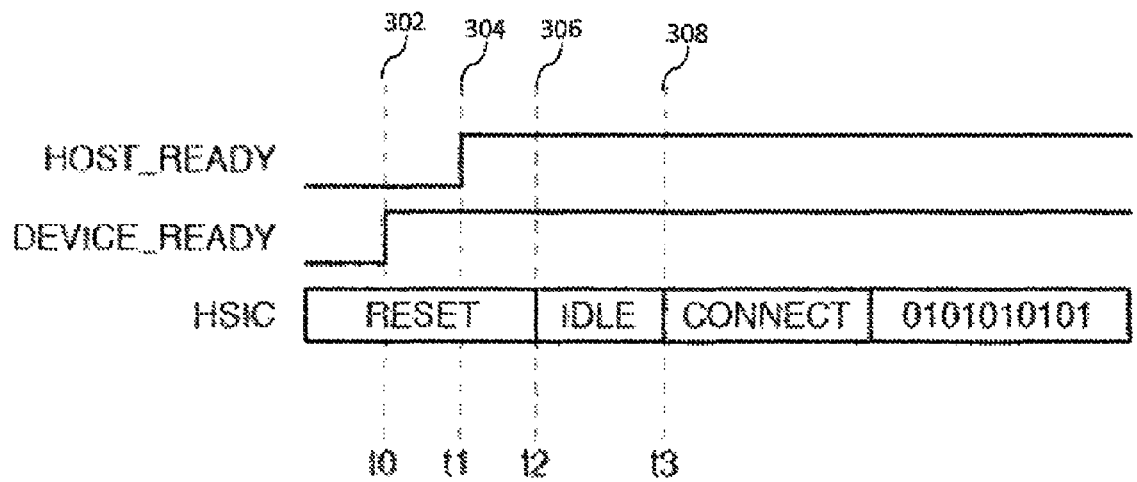
FIG. 3A is a logical representation of one exemplary Slave IC Initiated Connect Signaling transaction.

Referring now to FIG. 3A, exemplary Slave IC initiated Connect Signaling is shown.

As depicted, before time $t_0$ 302, the HSIC interface is in RESET state; at time $t_0$ 302 the slave IC asserts the DEVICE_READY.

When the master IC detects the DEVICE_READY, the master IC responsively asserts its HOST_READY at time $t_1$ 304 (expected to be within 50 ms of $t_0$ 302). Responsively, the slave IC begins monitoring the HSIC interface for IDLE signaling. Neither HOST_READY nor DEVICE_READY can be deasserted until after IDLE signaling has occurred.

At time $t_2$ 306, the master IC drives IDLE signaling (expected to be within 5 ms of $t_1$ 304). Responsively, the slave IC can drive a CONNECT transaction $t_3$ 308 (expected to be within 5 ms of $t_2$ 306), and subsequently thereafter transact data.

Figure 3B:
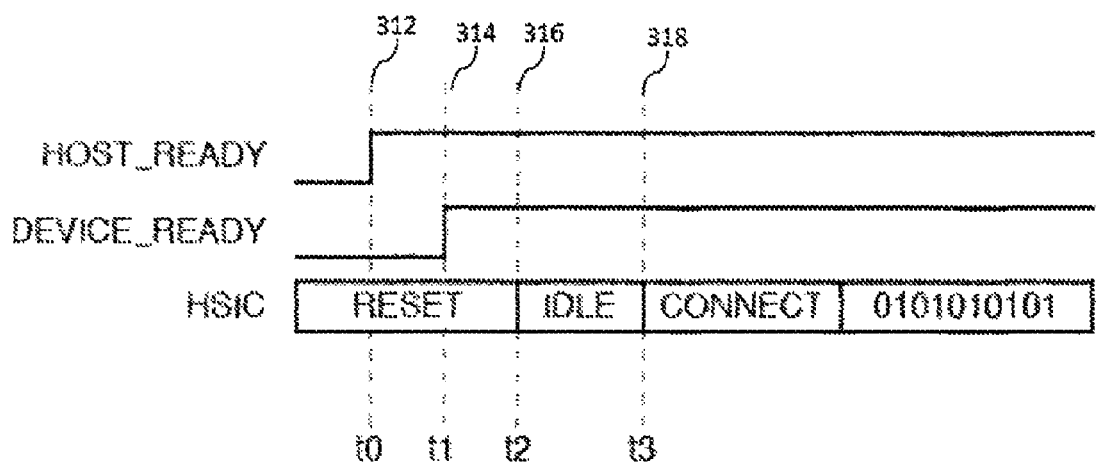
FIG. 3B is a logical representation of one exemplary Master IC Initiated Connect Signaling transaction.

Referring now to FIG. 3B, exemplary Master IC Initiated Connect Signaling is shown.

As depicted, before time $t_0$ 312, the HSIC interface is in RESET state; at time $t_0$ 312 the master IC asserts the HOST_READY.

When the slave IC detects the HOST_READY, the slave IC responsively asserts its DEVICE_READY at time $t_1$ 314 (expected to be within 50 ms of $t_0$ 312). At this time, the slave IC begins monitoring the HSIC interface for IDLE signaling. Similar to Slave IC Initiated Connect Signaling, neither HOST_READY nor DEVICE_READY can be deasserted until after IDLE signaling has occurred.

At time $t_2$ 316, the master IC drives IDLE signaling (expected to be within 5 ms of $t_1$ 314). Responsively, the slave IC can drive a CONNECT transaction $t_3$ 318 (expected to be within 5 ms of $t_2$ 316), and subsequently thereafter transact data.

Deadline Signaling—

Figure 3C:
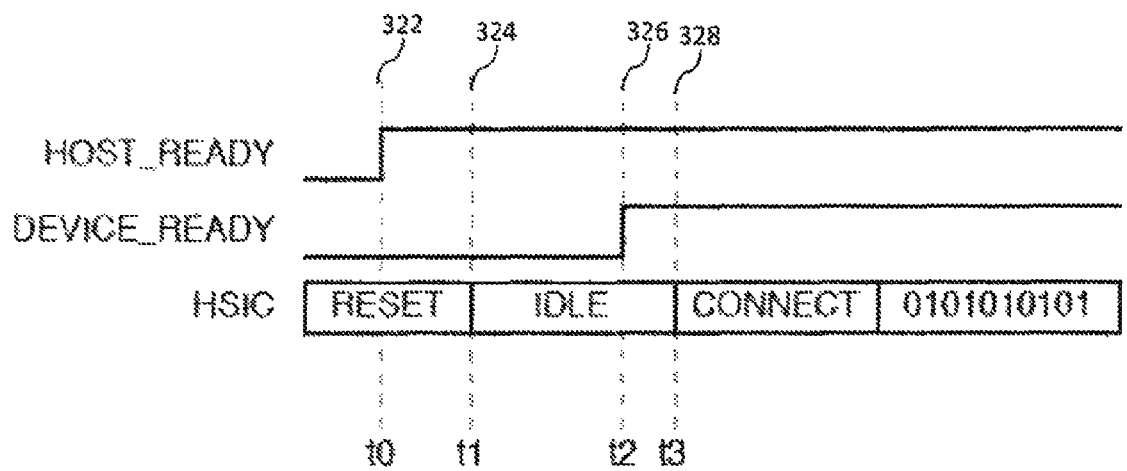
FIG. 3C is a logical representation of one exemplary Master IC Initiated Connect with Deadline Signaling transaction.

Referring now to FIG. 3C, exemplary Master IC Initiated Connect with Deadline Signaling is shown. In this scenario, when the slave IC does not assert DEVICE_READY in response to HOST_READY within a predetermined time interval, the master IC will continue to power the port in the event that the slave IC recovers from an assumed internal fault condition.

As depicted, before time $t_0$ 322, the HSIC interface is in RESET state; at time $t_0$ 322 the master IC asserts the HOST_READY.

In FIG. 3C, it is assumed that the slave IC does not detect the HOST_READY or alternately does not assert its DEVICE_READY within a reasonable deadline. Thus, at time $t_1$ 324 (expected to be within 500 ms of $t_0$ 322), the master IC proceeds with IDLE signaling. If, at this time, the slave IC has been monitoring the HSIC interface for IDLE signaling, then the slave IC can assert DEVICE_READY at time $t_2$ 326 (expected to be within 5 ms of $t_1$ 324) to recover HSIC bus operation.

Thereafter, the slave IC can drive a CONNECT transaction $t_3$ 328 (expected to be within 5 ms of $t_2$ 326), and subsequently thereafter transact data. In some variants, CONNECT and data transfer can happen as soon as IDLE is presented on the bus (i.e., the data transfer is not based on DEVICE_READY assertion).

Figure 3D:
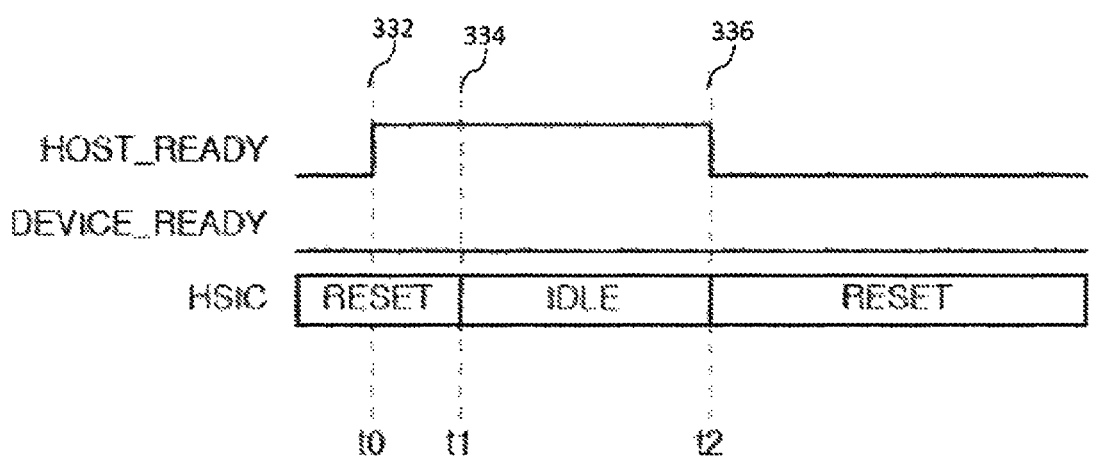
FIG. 3D is a logical representation of one exemplary Failed Master IC Initiated Connect with Deadline Signaling transaction.

Alternately, in FIG. 3D, a Failed Master IC Initiated Connect with Deadline Signaling is shown. In this scenario, when the slave IC does not assert DEVICE_READY in response to HOST_READY within a predetermined time interval and also cannot recover from an assumed internal fault condition, the master IC resets the bus interface.

As depicted, before time $t_0$ 332, the HSIC interface is in RESET state; at time $t_0$ 332 the master IC asserts the HOST_READY. The slave IC does not detect the HOST_READY or alternately does not assert its DEVICE_

READY within a reasonable deadline. Thus, at time t₁ 334 (expected to be within 500 ms of t₀ 332), the master IC proceeds with IDLE signaling.

Unfortunately, in this scenario, the slave IC is entirely unresponsive; thus, at time t₂ 336, the master IC deasserts HOST_READY and drives RESET on the HSIC bus.

Disconnect Signaling—

Existing HSIC devices do not support a disconnect capability (i.e., there is only a disconnect to connect signaling procedure). However, disconnection capabilities may be useful in certain important scenarios e.g.,: (i) suspend/wake of unused slave ICs, (ii) re-enumeration of devices during updates and/or initialization, (iii) suspend/wake of master ICs, and (iv) reset recovery from firmware faults. In some embodiments, disconnect signaling may be a rare occurrence and intended to resolve specific issues e.g., connectivity issues related to re-enumeration, and/or during a multi-stage boot process. Alternately, in some embodiments, disconnect signaling may be used to reduce power consumption.

Figure 3E:
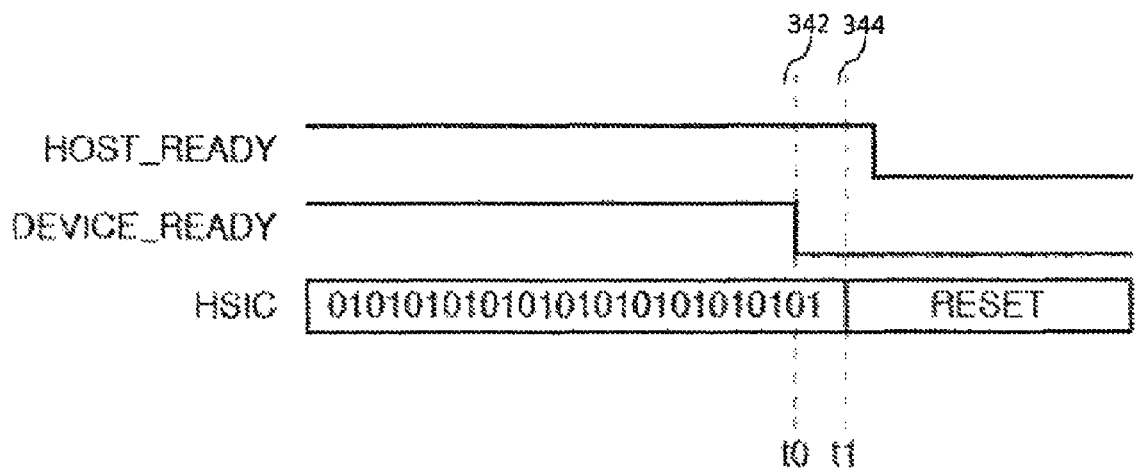
FIG. 3E is a logical representation of one exemplary Slave IC Initiated Disconnect Signaling transaction.

FIG. 3E illustrates an exemplary Slave IC Initiated Disconnect Signaling.

As depicted, at time t₀ 342, the HSIC interface is transacting data when the slave IC deasserts the DEVICE_READY. The slave IC continues data transactions until instructed to reset by the master IC. In some embodiments, the slave IC does not re-assert DEVICE_READY again until the master IC deasserts HOST_READY.

When the master IC detects the DEVICE_READY has been deasserted, the master IC responsively deasserts its HOST_READY at time t₁ 344 (expected to be within 50 ms of t₀ 342), and drives RESET on the HSIC bus resetting the bus state. In some variants, once the master IC deasserts the HOST_READY, the master IC may not re-assert the HOST_READY for a period of time (e.g., 10 ms).

Figure 3F:
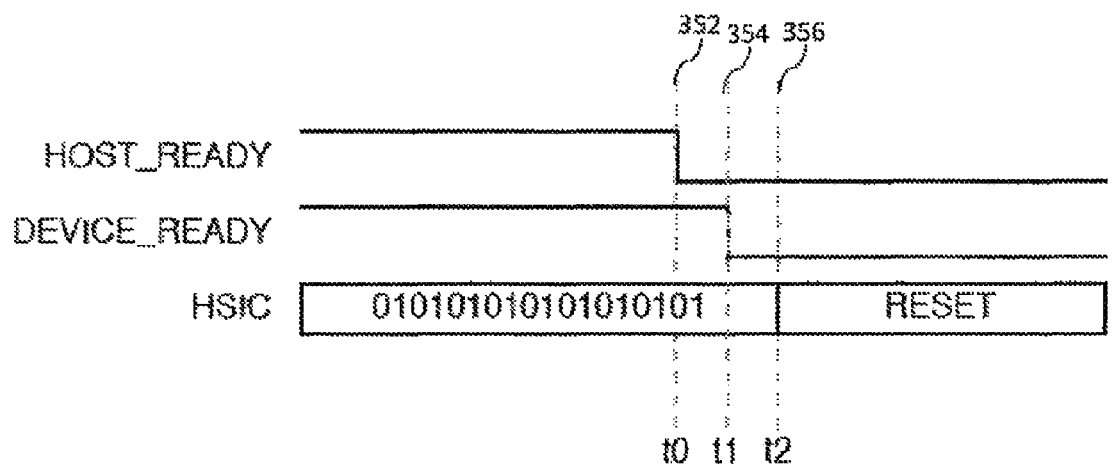
FIG. 3F is a logical representation of one exemplary Master IC Initiated Disconnect Signaling transaction.

FIG. 3F illustrates an exemplary Master IC Initiated Disconnect Signaling. Master IC Initiated Disconnect Signaling may occur when the master IC suspends or when the master IC determines that the slave IC has been idle for a sufficiently long time (e.g., to reduce power consumption).

As depicted, at time t₀ 352, the HSIC interface is transacting data when the master IC deasserts the HOST_READY. When the slave IC detects the HOST_READY has been deasserted, the slave IC responsively deasserts its DEVICE_READY at time t₁ 354 (expected to be within 50 ms of t₀ 352).

Once the master IC detects the DEVICE_READY deassertion, the master IC resets the HSIC interface t₂ 356. In some variants, the HSIC interface must be held in reset for a designated interval.

Figure 3G:
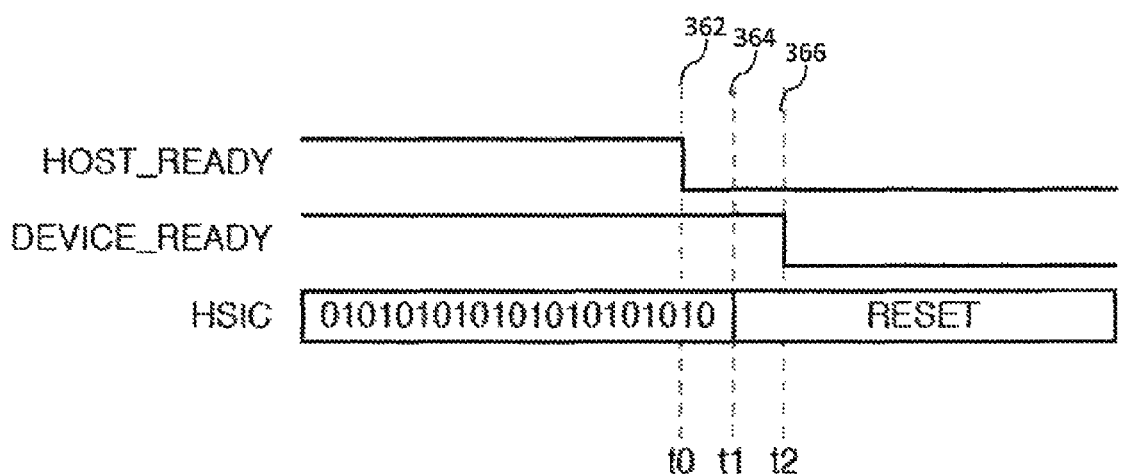
FIG. 3G is a logical representation of one exemplary Master IC Initiated Disconnect with Deadline Signaling transaction.

FIG. 3G illustrates an exemplary Master IC Initiated Disconnect with Deadline Signaling.

As depicted, at time t₀ 362, the HSIC interface is transacting data when the master IC deasserts the HOST_READY. When the slave IC does not deassert DEVICE_READY in response to HOST_READY being deasserted within a predetermined time interval, the master IC will force a RESET at time t₁ 364 (expected to be within 500 ms of t₀ 362) which will force the bus interface to reset.

When the slave IC detects the RESET, the slave IC responsively lowers DEVICE_READY at time t₂ 366.

In some variants, either HOST_READY and/or DEVICE_READY may have hysteresis requirements to prevent either the master IC or slave IC from requesting connection too quickly. Moreover, it is also appreciated that in certain circumstances a "race condition" can occur (a race condition occurs when a transition occurs faster than either the master IC or slave IC logic can appropriately settle). For example, in some cases, the DEVICE_READY and HOST_READY signaling can occur nearly simultaneously. During such an event, the disconnection may default to a Master IC Initiated Disconnect Signaling, thus requiring the master IC to reset the bus before further transactions occur.

Suspend and Resume—

In some embodiments, the master IC and slave IC may further support suspension and resumption of the HSIC interface to reduce power consumption during periods of inactivity. In various embodiments, the master IC can issue resume (a slave IC can issue a "remote wake") signaling on the HSIC interface. In alternate embodiments, resume signaling may be limited to either the master IC or the slave IC.

Moreover, it is further appreciated that in some embodiments, the host platforms are not able to detect remote wake events on the HSIC interface. Accordingly, certain variants may use out-of-band signaling (such as a general purpose input/output (GPIO), interrupt, etc.) to initiate the suspend/resume process.

Figure 3H:
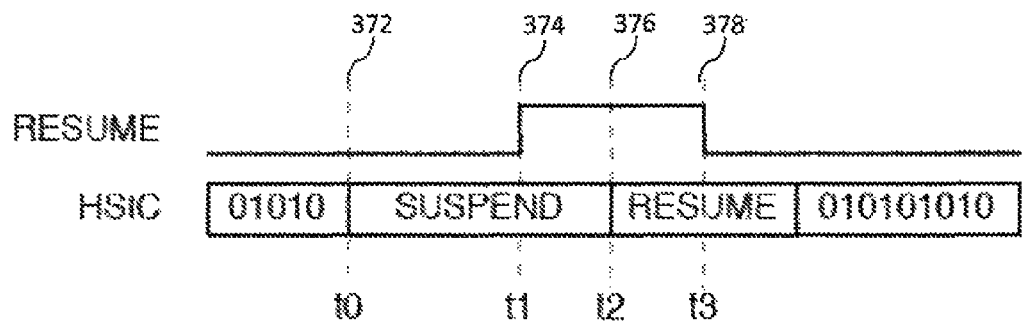
FIG. 3H is a logical representation of one exemplary Suspend and Resume Signaling transaction.

Referring now to FIG. 3H, exemplary Suspend and Resume Signaling is shown. In this implementation, an out-of-band low frequency GPIO is driven by the slave IC to the master IC to initiate resumption of the HSIC interface. As depicted, at time t₀ 372, the HSIC interface is transacting data when the master IC signals a SUSPEND transaction.

At time t₁ 374, the slave IC asserts the RESUME GPIO to resume bus operation. Responsively, at time t₂ 376 (expected to be less than 15 ms) the master IC drives the RESUME transaction (as shown, the RESUME transaction response is transmitted on the HSIC interface, not the RESUME GPIO).

When the slave IC receives the RESUME transaction on the HSIC interface, the slave IC can deassert the RESUME GPIO (t₂ 378) and resume data transactions.

It will be recognized that while certain embodiments are described in terms of a specific sequence of steps of a method, these descriptions are only illustrative of the broader methods of the present disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles disclosed and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure. The scope of the disclosure should be determined with reference to the claims.

What is claimed is:

1. A method for managing data connections between a plurality of integrated circuits (ICs) of a high-speed data interface, the method comprising:

while the high-speed data interface is in a disconnected state, performing a handshake procedure via an out-of-band interface, the handshake procedure comprising:
responsive to the first IC asserting a first signal indicating that a first IC is awake,
asserting a second signal by a second IC to indicate that the second IC is ready to connect;

wherein the high-speed data interface transitions to an idle state when the handshake procedure is successful; and establishing a data connection between the first IC and the second IC, the act of establishing the data connection comprising at least transferring one or more parameters related to at least one of the first IC and the second IC;

transferring one or more data between the first IC and the second IC; and terminating at least active data transfer over the data connection in response to a termination condition.

2. The method of claim 1, wherein the act of terminating comprises performing a second handshake procedure via the out-of-band interface.

3. The method of claim 2, wherein the second handshake procedure comprises deasserting the second signal by the second IC to indicate that the second IC is ready to disconnect.

4. The method of claim 3, wherein responsive to the deassertion of the second signal by the second IC, deasserting the first signal by the first IC and transitioning the high-speed data interface to the disconnected state.

5. The method of claim 1, wherein the act of transferring the one or more data comprises transmitting at a bitrate of 480 Megabits per second (Mbps).

6. The method of claim 5, wherein the act of performing the handshake procedure comprises using low frequency signaling via the out-of-band interface.

7. The method of claim 1, further comprising reducing at least one time constraint for data transfer based on the transferred one or more parameters.

8. An integrated circuit apparatus, the integrated circuit apparatus comprising:
a high-speed data interface configured to transact data with another integrated circuit;
an out-of-band interface configured to manage the high-speed data interface; and
first logic configured to perform a handshake procedure via the out-of-band interface while the high-speed data interface is in a disconnected state, the first logic configured to:
responsive to a first signal indicating that the another integrated circuit is awake,
assert a second signal to indicate that the integrated circuit apparatus is ready to connect once the high-speed data interface transitions to an idle state;
second logic configured to connect to the another integrated circuit, the second logic configured to:
when the high-speed data interface is in the idle state, establish a data connection between the integrated circuit apparatus and the another integrated circuit;
wherein the established data connection is configured based on one or more parameters related to at least one of the integrated circuit apparatus and the another integrated circuit; and
third logic configured to transfer one or more data between the integrated circuit apparatus and the another integrated circuit via the established data connection.

9. The integrated circuit apparatus of claim 8, wherein the high-speed data interface is a high speed integrated circuit (HSIC) interface comprising a source synchronous serial interface.

10. The integrated circuit apparatus of claim 9, wherein the source synchronous serial interface comprises a strobe signal and a data signal.

11. The integrated circuit apparatus of claim 8, wherein the out-of-band interface is physically distinct from the high-speed data interface.

12. The integrated circuit apparatus of claim 11, wherein the out-of-band interface comprises at least two general purpose input/output (GPIO) signals.

13. A system configured to manage a data connection between a plurality of integrated circuits (ICs) of a high-speed data interface, the system comprising:
a first and a second IC;
a high-speed data interface coupled to the first and the second IC;
an out-of-band interface coupled to the first and the second IC;
the first IC configured to assert a first signal via the out-of-band interface while the high-speed data interface is in a disconnected state to indicate that the first IC is awake;
responsive to the assertion of the first signal, the second IC asserts a second signal to indicate that the second IC is ready to connect once the high-speed data interface transitions to an idle state;
responsive to the assertion of both the first and the second signal, the high-speed data interface transitions to the idle state; and
when the high-speed data interface transitions to the idle state, the first and second IC establish a data connection;
wherein the established data connection is configured based on one or more parameters related to at least one of the first and the second IC; and
wherein the first and the second IC are configured to transfer one or more data via the established data connection.

14. The system of claim 13, wherein the first IC comprises a host IC and the second IC comprises a peripheral device IC.

15. The system of claim 13, wherein the first IC comprises a peripheral device IC and the second IC comprises a host IC.

16. The system of claim 13, wherein the high-speed data interface comprises a bi-directional data bus.

17. The system of claim 16, wherein the out-of-band interface comprises two unidirectional signals.

18. The system of claim 13, wherein the high-speed data interface comprises a high speed integrated circuit (HSIC) interface.

19. The system of claim 18, wherein the out-of-band interface comprises two general purpose input output (GPIO) signals.

20. The system of claim 13, wherein responsive to the deassertion of both the first and the second signal, the high-speed data interface transitions to a disconnected state.

* * * * *